United States Patent
Konno et al.

(10) Patent No.: US 9,444,967 B2
(45) Date of Patent: Sep. 13, 2016

(54) SOLID-STATE IMAGE SENSING DEVICE, IMAGE READING APPARATUS, AND IMAGE FORMING APPARATUS

(71) Applicants: Yoshio Konno, Kanagawa (JP); Masamoto Nakazawa, Kanagawa (JP)

(72) Inventors: Yoshio Konno, Kanagawa (JP); Masamoto Nakazawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/143,127

(22) Filed: Dec. 30, 2013

(65) Prior Publication Data
US 2014/0211273 A1 Jul. 31, 2014

(30) Foreign Application Priority Data
Jan. 29, 2013 (JP) ................................. 2013-014518

(51) Int. Cl.
| | |
|---|---|
| H04N 1/04 | (2006.01) |
| H04N 1/193 | (2006.01) |
| H04N 5/235 | (2006.01) |
| H04N 5/361 | (2011.01) |
| H04N 5/378 | (2011.01) |

(52) U.S. Cl.
CPC ............ *H04N 1/193* (2013.01); *H04N 1/0408* (2013.01); *H04N 5/2355* (2013.01); *H04N 5/361* (2013.01); *H04N 5/378* (2013.01)

(58) Field of Classification Search
CPC .. H04N 1/193; H04N 1/0408; H04N 5/2355; H04N 5/361; H04N 5/378
USPC ................................. 358/482, 474, 498, 497
See application file for complete search history.

(56) References Cited

U.S. PATENT DOCUMENTS

| | | | | |
|---|---|---|---|---|
| 5,933,189 | A | * | 8/1999 | Nomura ........................ 348/302 |
| 2004/0008387 | A1 | | 1/2004 | Ikeno |
| 2004/0233312 | A1 | * | 11/2004 | Tay .............................. 348/308 |
| 2006/0102827 | A1 | * | 5/2006 | Kasuga et al. ............. 250/208.1 |
| 2007/0188638 | A1 | | 8/2007 | Nakazawa et al. |
| 2008/0252787 | A1 | | 10/2008 | Nakazawa et al. |
| 2010/0027061 | A1 | | 2/2010 | Nakazawa |
| 2010/0171998 | A1 | | 7/2010 | Nakazawa |
| 2011/0026083 | A1 | | 2/2011 | Nakazawa |
| 2011/0051201 | A1 | | 3/2011 | Hashimoto et al. |
| 2011/0063488 | A1 | | 3/2011 | Nakazawa |
| 2012/0008173 | A1 | | 1/2012 | Konno et al. |
| 2012/0092732 | A1 | | 4/2012 | Nakazawa |

(Continued)

FOREIGN PATENT DOCUMENTS

| | | |
|---|---|---|
| JP | 2000-358139 | 12/2000 |
| JP | 2004-048167 | 2/2004 |
| JP | 2009-284108 | 12/2009 |

OTHER PUBLICATIONS

U.S. Appl. No. 13/912,341, filed Jun. 7, 2013.

*Primary Examiner* — Houshang Safaipour
(74) *Attorney, Agent, or Firm* — Oblon, McClelland, Maier & Neustadt, L.L.P.

(57) ABSTRACT

A solid-state image sensing device includes: a photoelectric conversion unit that converts light into electrical signals for respective pixels and outputs the electrical signals; a signal separation unit that separates an offset signal, which is generated due to dark current, from each of the electrical signals outputted by the photoelectric conversion unit and outputs image signals which are electrical signals converted from light for the respective pixels; and a signal adding unit that adds the image signals, which is outputted from the signal separation unit, for each group of a plurality of pixels.

17 Claims, 13 Drawing Sheets

(56) References Cited

U.S. PATENT DOCUMENTS

| | | |
|---|---|---|
| 2012/0224205 A1 | 9/2012 | Nakazawa |
| 2013/0063792 A1 | 3/2013 | Nakazawa |
| 2013/0071036 A1* | 3/2013 | Suzuki ............... H04N 5/23232 |
| | | 382/218 |
| 2014/0063293 A1* | 3/2014 | Tay .......................... 348/231.99 |

* cited by examiner pix_num=M/N
M: BASIC RESOLUTION
N: CONVERTED RESOLUTION

SOLID-STATE IMAGE SENSING DEVICE, IMAGE READING APPARATUS, AND IMAGE FORMING APPARATUS

CROSS-REFERENCE TO RELATED APPLICATIONS

The present application claims priority to and incorporates by reference the entire contents of Japanese Patent Application No. 2013-014518 filed in Japan on Jan. 29, 2013.

BACKGROUND OF THE INVENTION

1. Field of the Invention

The present invention relates to a solid-state image sensing device, an image reading apparatus, and an image forming apparatus.

2. Description of the Related Art

A resolution conversion technique is conventionally known which increases an image reading rate and reduces the size of read image data by reading images at a resolution lower than the resolution at which the image reading apparatus can perform reading. By reading images at a lowered resolution, the amount of light emission from a reading light source can be kept down and thereby power saving can be achieved.

In a case where the resolution in image reading is lowered to enhance the productivity in reading of a document, an image reading period (line period) in a main-scanning direction is shortened, for example. In this case, accumulation time of electric charge, which are generated by photoelectrical conversion by an image sensor to read the document, may be shortened and thereby an output level of the image sensor may decrease (i.e., an SN ratio regarding the image may be deteriorated and image quality may be degraded). For preventing the SN ratio regarding the image from being deteriorated by the resolution conversion, it is known to add successive pixel data so as to suppress the decrease in the output level of the image sensor.

Japanese Patent Application Laid-open No. 2004-048167 discloses an image reading apparatus having a mode in which a signal formed by adding two image signals is used as pixel data and a mode in which pixel signals of even-numbered light receiving elements are used as image data so as to perform read operation at a high rate in a sub-scanning direction.

However, in image sensors, dark current flows even when no light is incident. As a result, electric charge is stored as an offset. That is, when pixel signals including the offsets are added for resolution conversion, a dynamic range of image data after resolution conversion is disadvantageously narrowed.

In view of the above, there is a need to provide a solid-state image sensing device, an image reading apparatus, and an image forming apparatus which can prevent the dynamic range of image data from being narrowed even when resolution conversion is performed.

SUMMARY OF THE INVENTION

It is an object of the present invention to at least partially solve the problems in the conventional technology.

A solid-state image sensing device includes: a photoelectric conversion unit that converts light into electrical signals for respective pixels and outputs the electrical signals; a signal separation unit that separates an offset signal, which is generated due to dark current, from each of the electrical signals outputted by the photoelectric conversion unit and outputs image signals which are electrical signals converted from light for the respective pixels; and a signal adding unit that adds the image signals, which is outputted from the signal separation unit, for each group of a plurality of pixels.

An image reading apparatus includes a solid-state image sensing device as described above.

A solid-state image sensing device includes: a photoelectric conversion unit that converts light into electrical signals for respective pixels and outputs the electrical signals; a signal separation unit that separates an offset signal, which is generated due to dark current, from each of the electrical signals outputted by the photoelectric conversion unit and outputs image signals which are electrical signals converted from light for the respective pixels; and a signal averaging unit that averages the image signals, which is outputted from the signal separation unit, for each group of a plurality of pixels.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
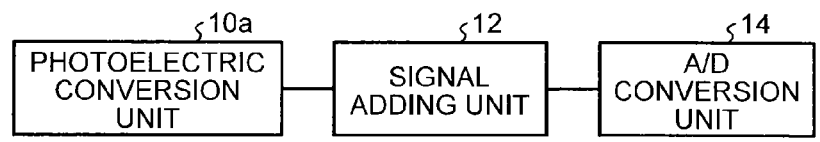
FIG. 1 is a block diagram illustrating a schematic configuration of a solid-state image sensing device which enables resolution conversion.

First, the background that the present invention has been invented will be described. FIG. 1 is a block diagram illustrating a schematic configuration of a solid-state image sensing device which enables resolution conversion. For example, the solid-state image sensing device is a CMOS linear image sensor including a photoelectric conversion unit 10a, a signal adding unit 12, and an A/D conversion unit 14.

For example, the photoelectric conversion unit 10a is formed by arraying a plurality of photoelectric conversion elements (not illustrated), such as photo diodes, to convert light into electrical signals for respective pixels and to output the converted electrical signals. The signal adding unit 12 adds pixel data, represented by electric charge accumulated in the photoelectric conversion unit 10a upon reception of light, for a plurality of consecutive pixels. The A/D conversion unit 14 converts pixel data, each obtained by adding image data by the signal adding unit 12, into a 10-bit digital signal for example.

In the solid-state image sensing device illustrated in FIG. 1, dark current flows in the photoelectric conversion elements even when no light is incident. In other words, when the photoelectric conversion unit 10a outputs pixel data represented by the electric charge accumulated upon light reception, an offset signal caused by the dark current is included in the pixel data.

Thus, each of a plurality of pixel data includes the offset signal caused by the dark current. Therefore, when the signal adding unit 12 adds (i.e., performs resolution conversion on) a plurality of pixel data outputted by the photoelectric conversion unit 10a, respective offset signals are also added and an effective dynamic range of the image data is thereby narrowed.

Figure 2:
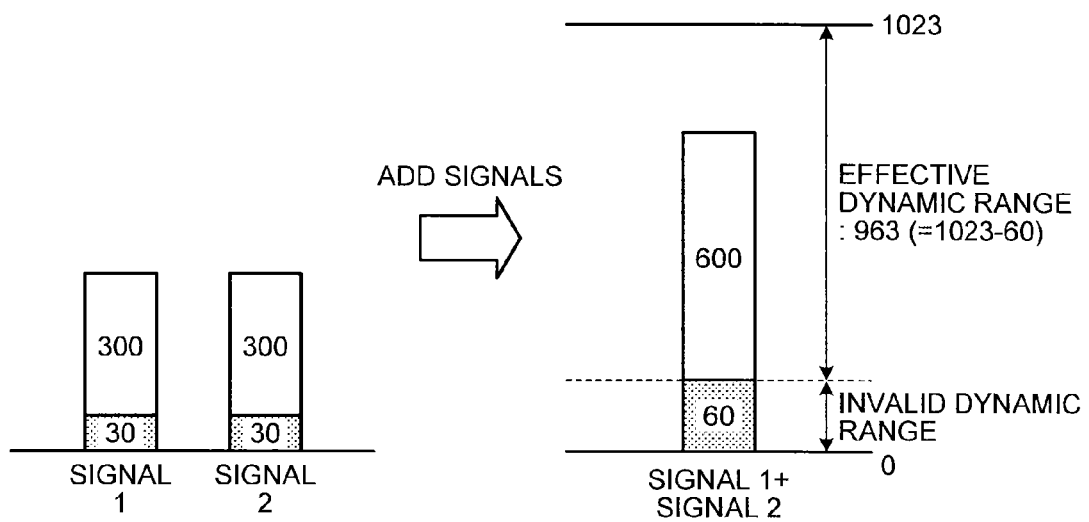
FIG. 2 illustrates an operation example of the solid-state image sensing device illustrated in FIG. 1.

FIG. 2 illustrates an operation example of the solid-state image sensing device illustrated in FIG. 1. For example, as illustrated in FIG. 2, two photoelectric conversion elements of the photoelectric conversion unit 10a output respective signals 1 and 2. Each of these two signals 1 and 2 includes, for example, an offset signal with a value of 30 and effective image data (an image signal) with a value of 300. When the signal adding unit 12 adds the signals 1 and 2, the value of the offset signal becomes 60 and the value of the effective pixel data becomes 600.

Therefore, the sum of the offset signal with a value of 60 and the pixel data with a value of 600 ends up being included in the dynamic range. The offset signal forms an invalid range within the dynamic range. Accordingly, when the dynamic range is 10 bits (0 to 1023), the effective dynamic range is equal to 963 (=1023-60). Thus, when the pixel data including the offset signals are added, the dynamic range of the image signal is narrowed.

First Embodiment

Figure 3:
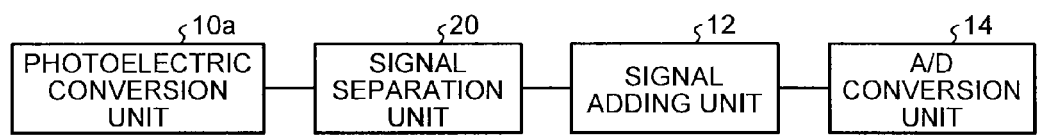
FIG. 3 is a block diagram illustrating a schematic configuration of a solid-state image sensing device according to a first embodiment.

Next, a first embodiment of a solid-state image sensing device will be described in detail. FIG. 3 is a block diagram illustrating a schematic configuration of the solid-state image sensing device according to the first embodiment. The solid-state image sensing device according to the first embodiment is a CMOS linear image sensor, for example, and includes a photoelectric conversion unit 10a, a signal separation unit 20, a signal adding unit 12, and an A/D conversion unit 14. In the solid-state image sensing device illustrated in FIG. 3, component members substantially identical to those forming the solid-state image sensing device illustrated in FIG. 1 are designated by identical reference numerals.

The signal separation unit 20 separates (deletes) an offset signal, generated due to the dark current, from each of the electrical signals outputted by the photoelectric conversion unit 10a, and outputs, to the signal adding unit 12, image signals which are electrical signals converted from light for respective pixels. Here, the signal separation unit 20 separates the offset signal by, for example, analog correlated double sampling (CDS).

The signal adding unit 12 adds the image signals outputted by the signal separation unit 20 for each group of a plurality of consecutive pixels. For example, the A/D conversion unit 14 converts pixel data (image signals), each obtained by adding image data by the signal adding unit 12, into a 10-bit digital signal. This indicates that the image data which are converted into the digital signal by the A/D conversion unit 14 does not include any offset signal.

Figure 4:
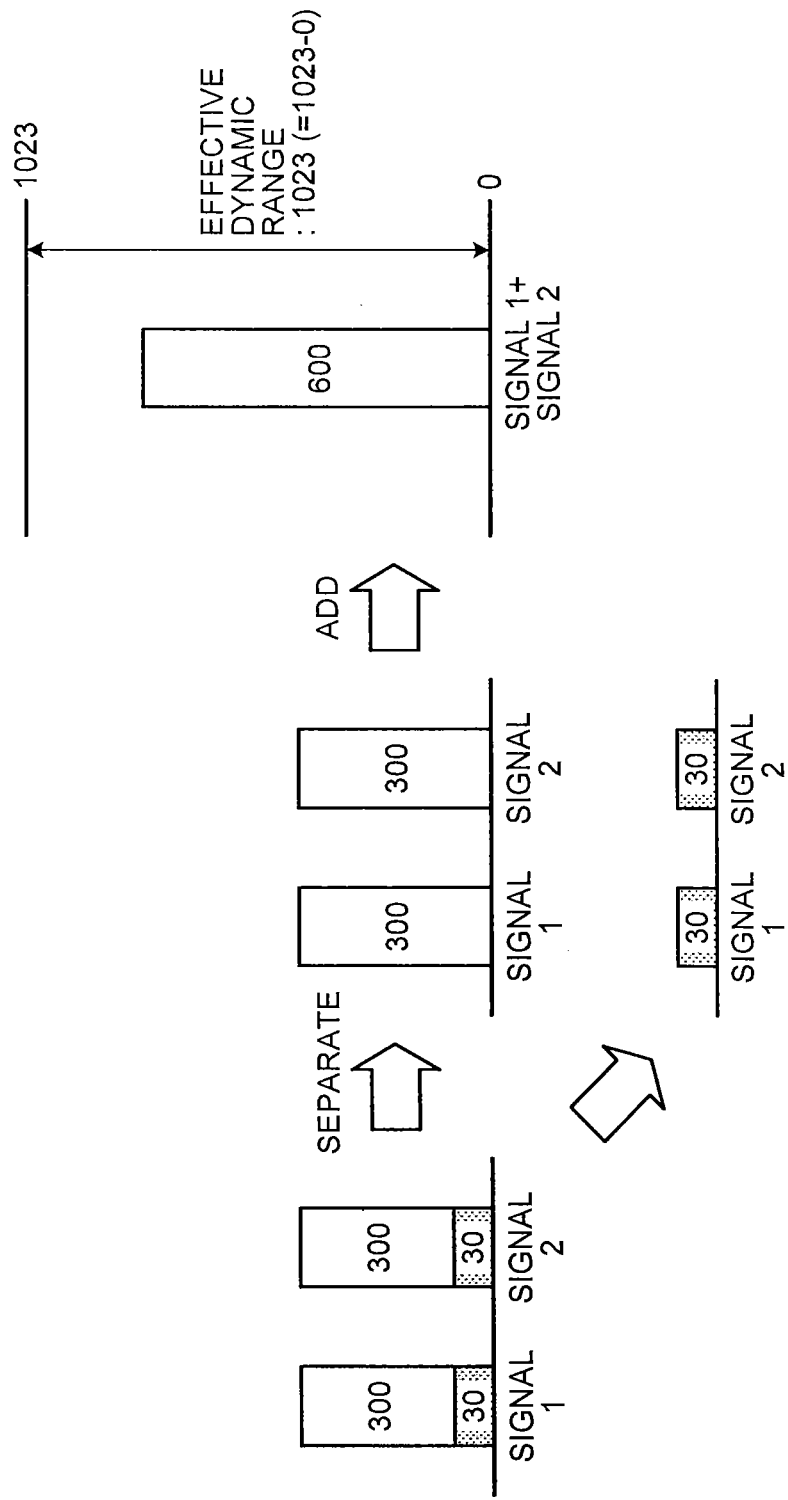
FIG. 4 illustrates an operation example of the solid-state image sensing device illustrated in FIG. 3.

FIG. 4 illustrates an operation example of the solid-state image sensing device illustrated in FIG. 3. For example, as illustrated in FIG. 4, two photoelectric conversion elements of the photoelectric conversion unit 10a output respective signals 1 and 2. Each of these two signals 1 and 2 includes, for example, an offset signal with a value of 30 and effective image data (an image signal) with a value of 300. The signal separation unit 20 separates the offset signal with a value of 30 from each of the signals 1 and 2, and outputs, to the signal adding unit 12, image signals with a value of 300 which are electrical signals converted from light for the respective pixels. The signal adding unit 12 adds only the image signals with their offset signals being separated, so that an effective pixel data value of 600 is obtained.

Therefore, only the pixel data with a value of 600 are included in the dynamic range.

This indicates that the dynamic range does not include any invalid signal. Therefore, when the dynamic range is 10 bits (0 to 1023), the effective dynamic range is equal to 1023 (=1023−0). Thus, when the pixel data with their offset signals being separated are added, it becomes possible to prevent the dynamic range of the image signal from being narrowed.

Second Embodiment

Figure 5:
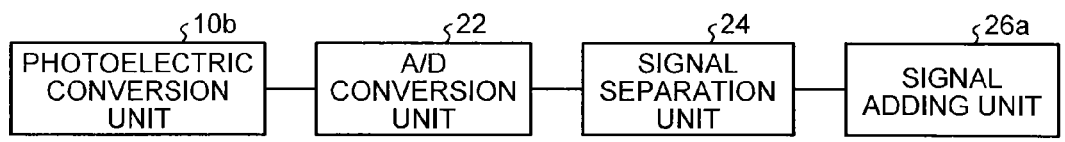
FIG. 5 is a block diagram illustrating a schematic configuration of a solid-state image sensing device according to a second embodiment.

Next, a second embodiment of a solid-state image sensing device will be described in detail. FIG. 5 is a block diagram illustrating a schematic configuration of the solid-state image sensing device according to the second embodiment. The solid-state image sensing device according to the second embodiment is a CMOS linear image sensor, for example, and includes a photoelectric conversion unit 10b, an A/D conversion unit 22, a signal separation unit 24, and a signal adding unit 26a.

The photoelectric conversion unit 10b is formed by arraying a plurality of photoelectric conversion elements (not illustrated), such as photo diodes, to convert light into electrical signals for respective pixels and to output the converted electrical signals. The photoelectric conversion unit 10b outputs, to the A/D conversion unit 22, voltages corresponding to electric charge accumulated in accordance with light. The A/D conversion unit 22 converts the electrical signals, which have been outputted for the respective pixels by the photoelectric conversion unit 10b, into parallel 10-bit digital signals for example, and outputs the converted digital signals to the signal separation unit 24.

The signal separation unit 24 separates (deletes) an offset signal, generated due to the dark current, from each of the digit signals outputted by the A/D conversion unit 22, and outputs, to the signal adding unit 26a, image signals which are electrical signals converted from light for respective pixels. Here, the signal separation unit 24 separates an offset signal by, for example, digital correlated double sampling (CDS).

The signal adding unit 26a adds the image signals outputted by the signal separation unit 24 for each group of a plurality of consecutive pixels. This indicates that the offset signal is not included in the image signals to be added by the signal adding unit 26a.

The solid-state image sensing device illustrated in FIG. 5 separates the offset signal after the pixel data is converted into a digital signal. In other words, unlike the solid-state image sensing device illustrated in FIG. 2, the solid-state image sensing device in the present embodiment does not need to electrically hold an analog signal level for execution of addition processing. The pixel data converted into a digital signal can be held in a register or a memory.

In other words, since an offset signal is separated after the pixel data is converted into a digital signal, the solid-state image sensing device illustrated in FIG. 5 does not need the capacitance for retaining the electric charge in the photoelectric conversion unit 10b. It is also not necessary to provide a switch that switches accumulation and discharge of electric charge in and from the capacitance in accordance with the number of signals (=the number of pixels) to be added. As a result, a circuit size can be reduced. Therefore, it becomes possible to prevent increase in parasitic capacitance due to formation of the capacitance and the switch.

First Specific Example

Figure 6:
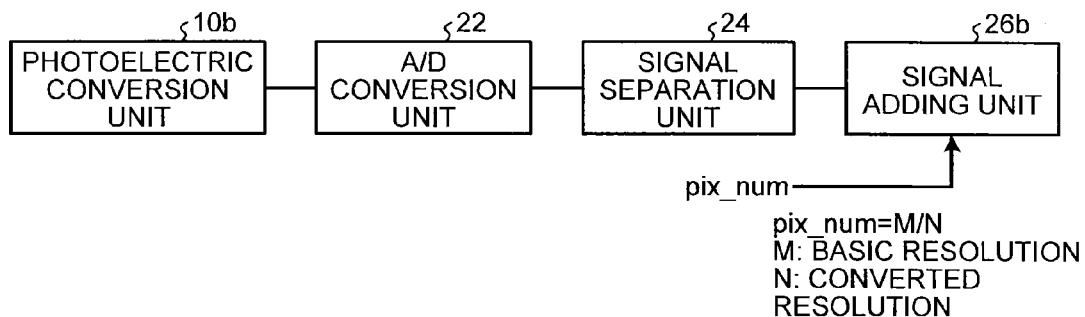
FIG. 6 is a block diagram illustrating a schematic configuration of a first specific example of the solid-state image sensing device according to the second embodiment.

FIG. 6 is a block diagram illustrating a schematic configuration of a first specific example of the solid-state image sensing device according to the second embodiment. For example, as illustrated in FIG. 6, the first specific example of the solid-state image sensing device is a CMOS linear image sensor including a photoelectric conversion unit 10b, an A/D conversion unit 22, a signal separation unit 24, and a signal adding unit 26b. In the solid-state image sensing device illustrated in FIG. 6, component members substantially identical to those forming the solid-state image sensing device illustrated in FIG. 5 are designated by identical reference numerals.

The signal adding unit 26b adds image signals outputted by the signal separation unit 24 for each group of a plurality of consecutive pixels. Here, the signal adding unit 26b adds the image signals for each group of pixels the number of which corresponds to a ratio between resolutions before and after the resolution conversion performed for resolution reduction. More specifically, the signal adding unit 26b determines the number of signals to be added (the number of operation pixels) based on pix_num. The parameter pix_num is a ratio (M/N) of a basic resolution (such as a readable resolution) M to a converted resolution N. For example, the value of the converted resolution N is configured to be variable.

Figure 7:
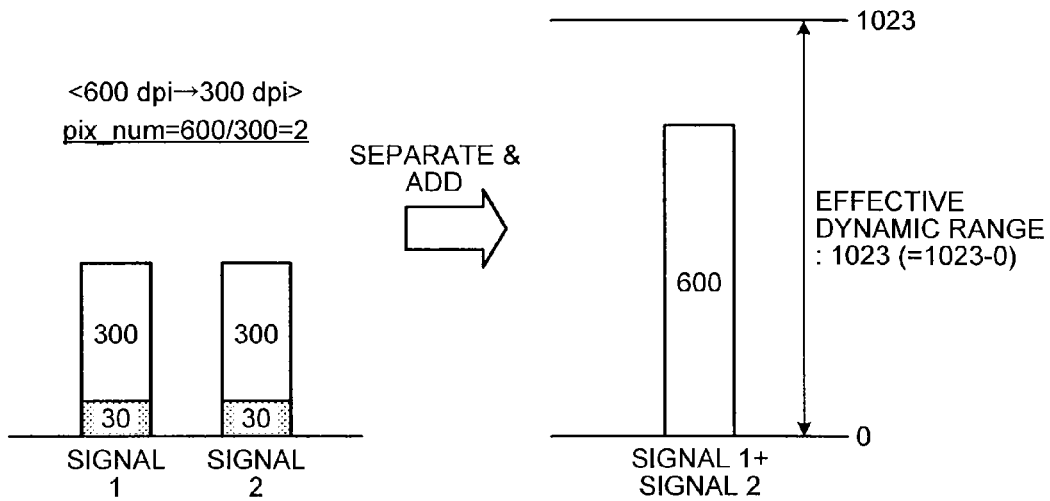
FIG. 7 illustrates an operation example of the solid-state image sensing device illustrated in FIG. 6 with a resolution being converted from a basic resolution (600 dpi) to a resolution of 300 dpi.
Figure 8:
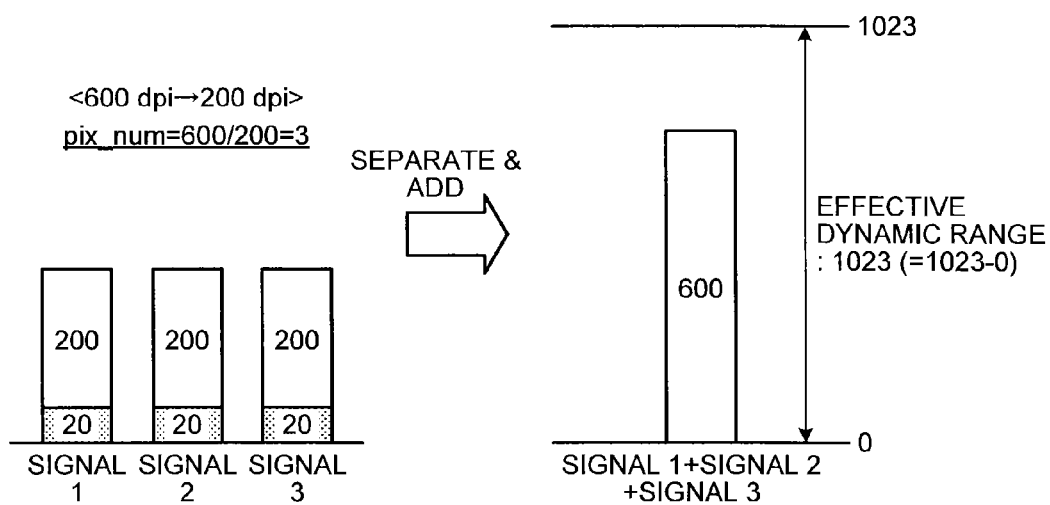
FIG. 8 illustrates an operation example of the solid-state image sensing device illustrated in FIG. 6 with the resolution being converted from the basic resolution (600 dpi) to a resolution of 200 dpi.

FIG. 7 illustrates an operation example of the solid-state image sensing device illustrated in FIG. 6 with the resolution being converted from a basic resolution (600 dpi) to a resolution of 300 dpi. FIG. 8 illustrates an operation example of the solid-state image sensing device illustrated in FIG. 6 with the resolution being converted from the basic resolution (600 dpi) to a resolution of 200 dpi. In both the operation examples illustrated in FIGS. 7 and 8, the solid-state image sensing device implements resolution conversion without causing the effective dynamic range to be narrowed.

Second Specific Example

Figure 9:
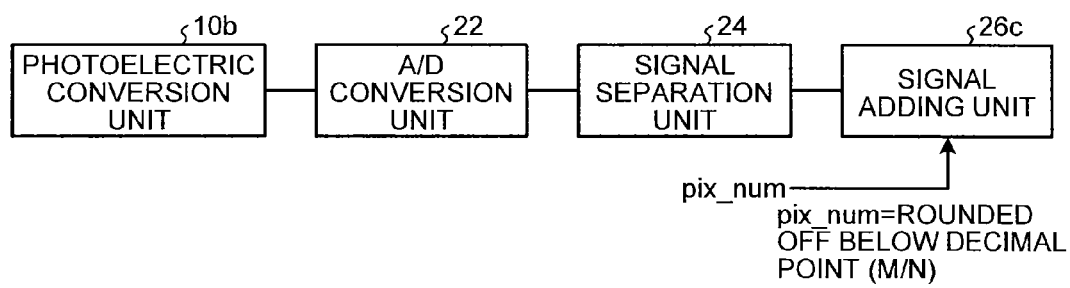
FIG. 9 is a block diagram illustrating a schematic configuration of a second specific example of the solid-state image sensing device according to the second embodiment.

FIG. 9 is a block diagram illustrating a schematic configuration of a second specific example of the solid-state image sensing device according to the second embodiment. The second specific example of the solid-state image sensing device is a CMOS linear image sensor, for example, and includes a photoelectric conversion unit 10b, an A/D conversion unit 22, a signal separation unit 24, and a signal adding unit 26c, as illustrated in FIG. 9. In the solid-state image sensing device illustrated in FIG. 9, component members substantially identical to those forming the solid-state image sensing device illustrated in FIG. 5 are designated by identical reference numerals.

The signal adding unit 26c adds image signals outputted by the signal separation unit 24 for each group of a plurality of consecutive pixels. Here, the signal adding unit 26c adds the image signals for each group of pixels the number of which is a maximum integer equal to or less than a ratio between resolutions before and after the resolution conversion performed for resolution reduction. More specifically, the signal adding unit 26c determines the number of signals to be added (the number of operation pixels) based on pix_num. Note that the signal adding unit 26c rounds off the result of the aforementioned M/N operation below the decimal point.

Figure 10:
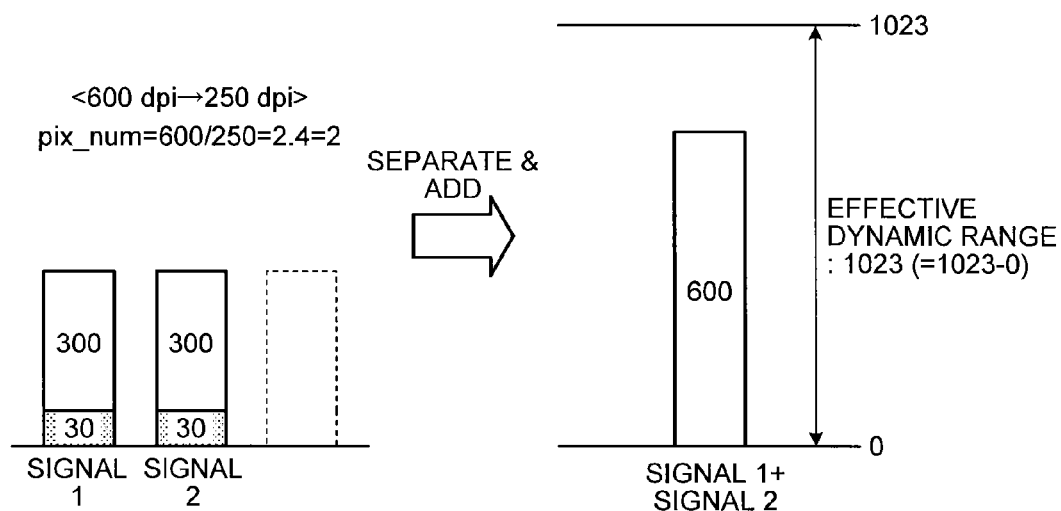
FIG. 10 illustrates an operation example of the solid-state image sensing device illustrated in FIG. 9 with the resolution being converted from the basic resolution (600 dpi) to a resolution of 250 dpi.

FIG. 10 illustrates an operation example of the solid-state image sensing device illustrated in FIG. 9 with the resolution being converted from the basic resolution (600 dpi) to a resolution of 250 dpi. As illustrated also in FIG. 10, the signal adding unit 26c rounds off the result of the M/N operation below the decimal point. As a result, pix_num is equal to 600/200=2.4=2, and so the number of operation pixels is 2. In this operation example, the solid-state image sensing device also implements resolution conversion without causing the effective dynamic range to be narrowed.

Figure 11:
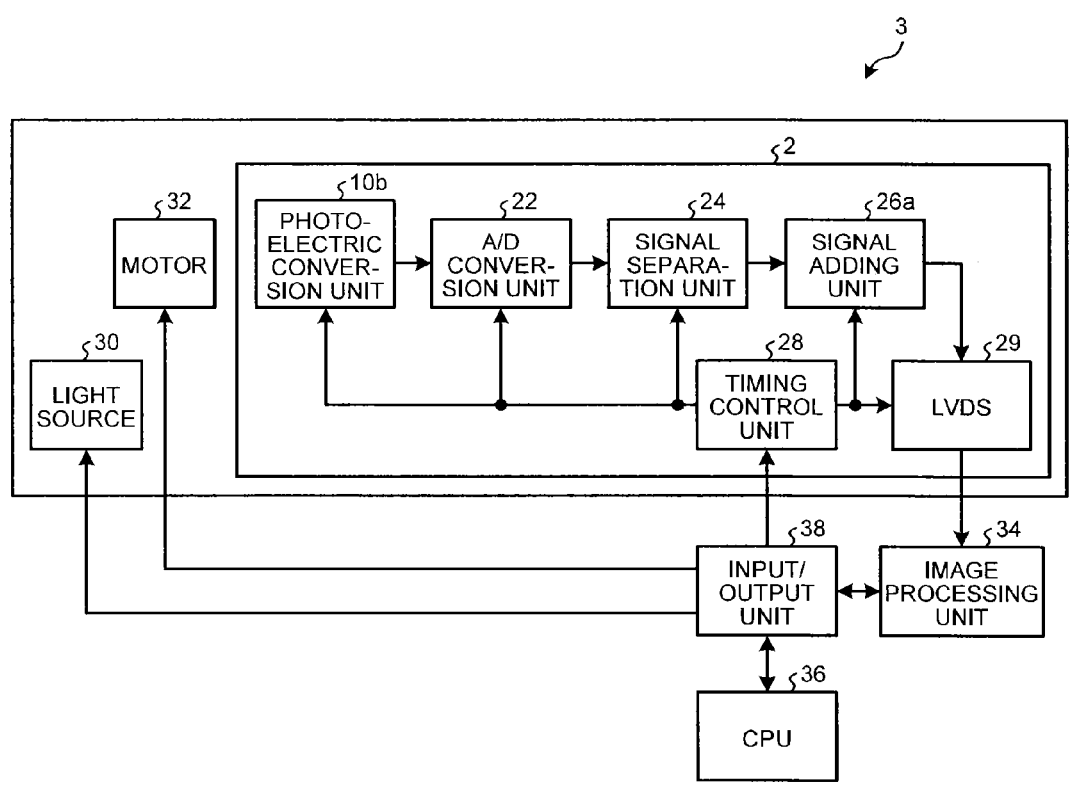
FIG. 11 is a block diagram illustrating a configuration example of an image reading apparatus including a third specific example of the solid-state image sensing device according to the second embodiment.

FIG. 11 is a block diagram illustrating a configuration example of an image reading apparatus 3 including a third specific example of the solid-state image sensing device (solid-state image sensing device 2) according to the second embodiment. In the image reading apparatus 3 illustrated in FIG. 11, component members substantially identical to those forming the solid-state image sensing device illustrated in FIG. 5 are designated by identical reference numerals.

The image reading apparatus 3 includes a solid-state image sensing device 2, a light source 30, a motor 32, an image processing unit 34, a CPU 36, and an input/output unit

38. For example, the solid-state image sensing device 2 includes a photoelectric conversion unit 10*b*, an A/D conversion unit 22, a signal separation unit 24, a signal adding unit 26*a*, a timing control unit 28, and an LVDS 29.

The timing control unit 28 drives the photoelectric conversion unit 10*b*, the A/D conversion unit 22, the signal separation unit 24, the signal adding unit 26*a*, and the LVDS 29 with set timing. The image reading apparatus 3 irradiates a document with light from the light source 30. The image reading apparatus 3 then reads a document image with an unshown substrate, on which the solid-state image sensing device 2 is mounted, while performing scanning with the motor 32. The LVDS 29 outputs image data, read with the solid-state image sensing device 2, to the image processing unit 34. The CPU 36 controls the timing control unit 28, the light source 30, the motor 32, and the image processing unit 34 via the input/output unit 38.

Figure 12:
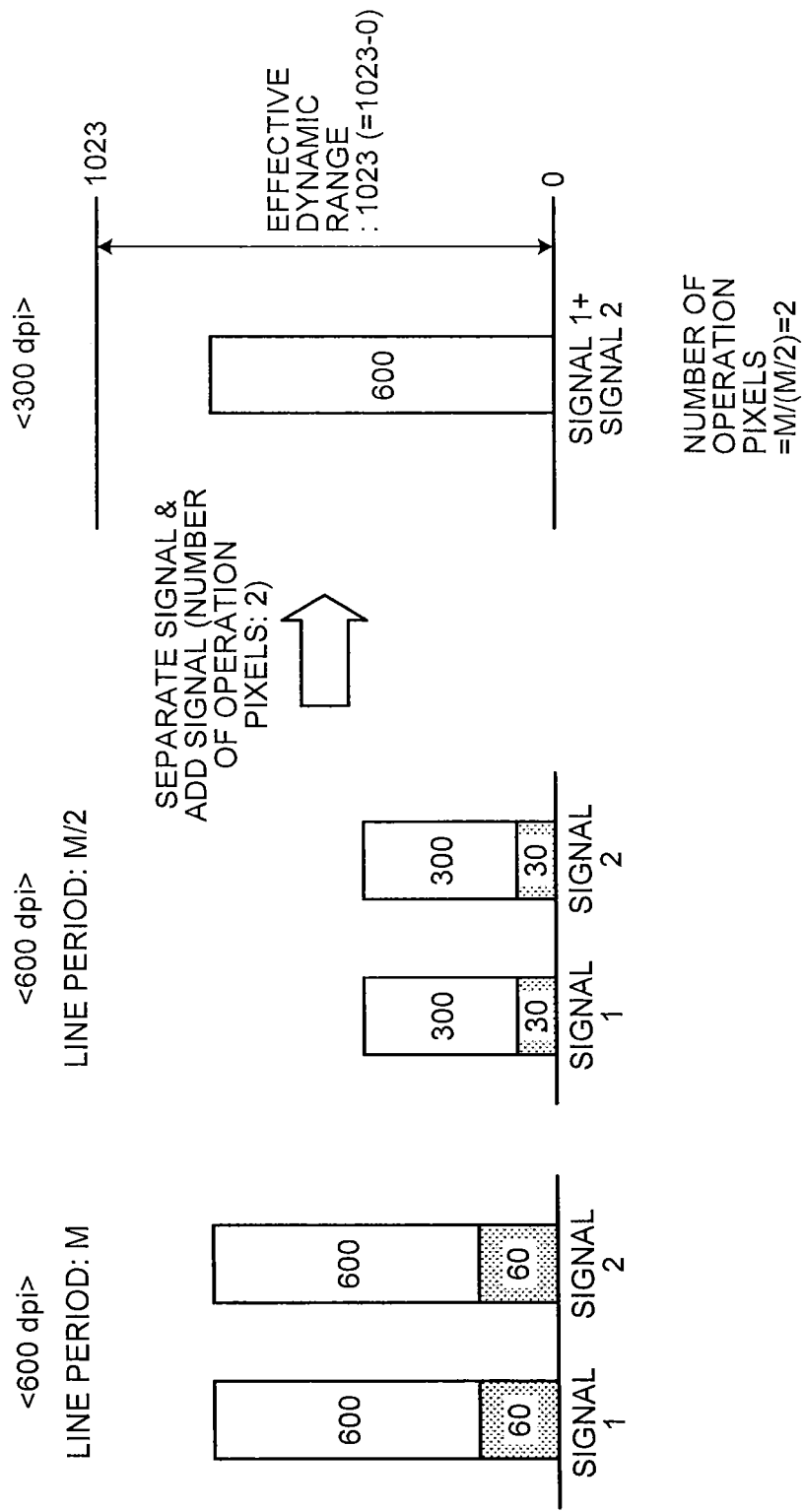
FIG. 12 illustrates a first operation example of the image reading apparatus illustrated in FIG. 11.

FIG. 12 illustrates a first operation example of the image reading apparatus 3 illustrated in FIG. 11. To enhance the productivity in document reading, the image reading apparatus 3 changes a line period M to, for example, a line period M/2. However, "the line period" is nearly equal to (≈) "time during which the photoelectric conversion unit 10*b* accumulates electric charge". Accordingly, if the line period is reduced to half for example, the accumulation time of electric charge is also reduced to half, which leads to decrease in output level of the photoelectric conversion unit 10*b* (=deterioration in S/N ratio regarding an image). Therefore, the image reading apparatus 3 determines the number of operation pixels based on a basic line period (M) and a line period (M/2) after resolution conversion. For example, the image reading apparatus 3 sets the number of operation pixels for addition processing to M/(M/2)=2. Therefore, the image reading apparatus 3 can prevent the dynamic range from being narrowed, enhance the productivity in image reading, and can also prevent the S/N ratio regarding the image from being deteriorated.

Figure 13:
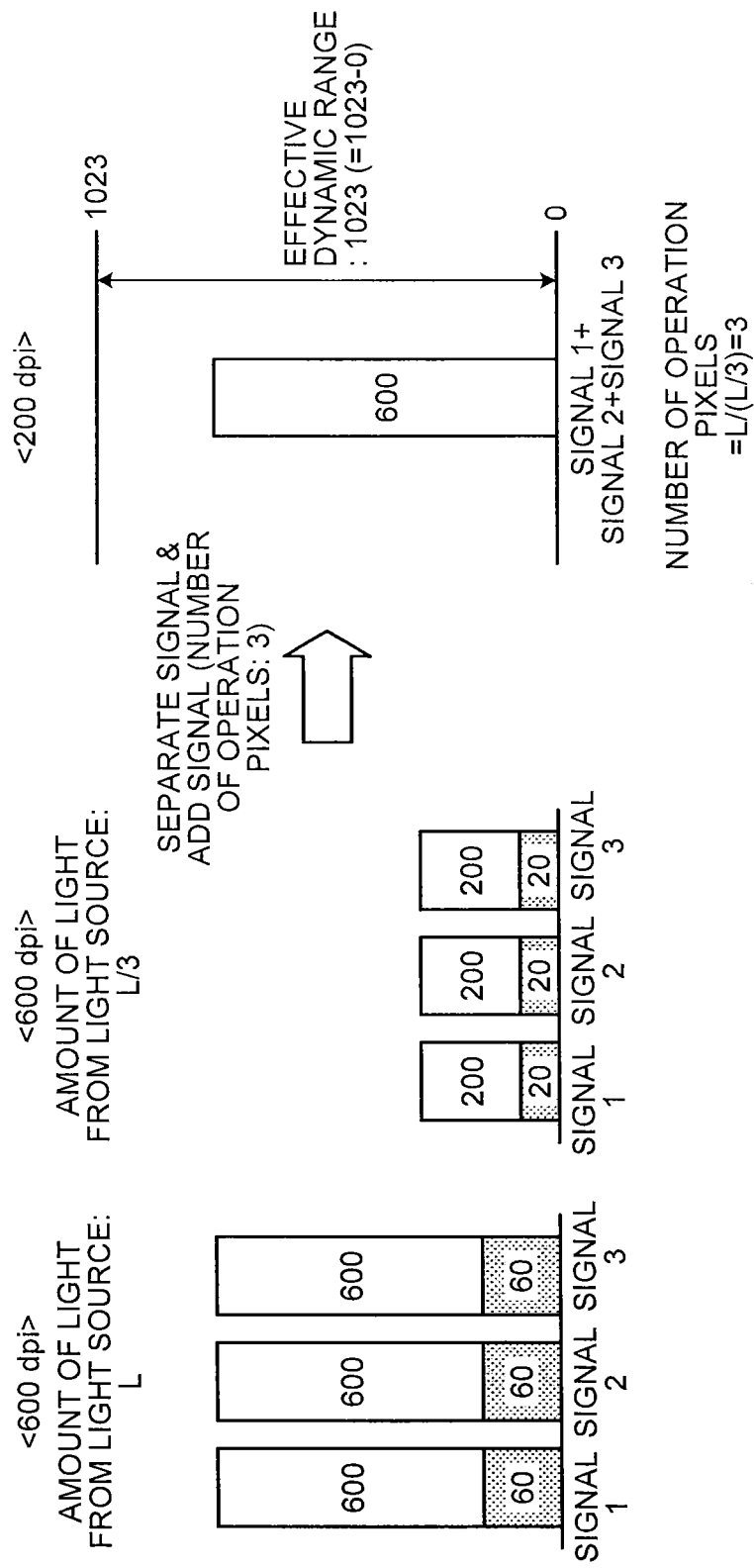
FIG. 13 illustrates a second operation example of the image reading apparatus illustrated in FIG. 11.

FIG. 13 illustrates a second operation example of the image reading apparatus 3 illustrated in FIG. 11. In the second operation example, the image reading apparatus 3 suppresses power consumption by reducing the amount of light from the light source 30 in image reading. However, if the amount of light from the light source is reduced to, for example, ⅓, the electric charge that can be accumulated by the photoelectric conversion unit 10*b* is also reduced to ⅓. Accordingly, at the time of resolution conversion, the image reading apparatus 3 sets the number of operation pixels for addition processing to L/(L/3)=3, where L represents a basic light amount and L/3 represents the amount of light from the light source after light amount reduction. As a result, the image reading apparatus 3 can prevent the dynamic range from being narrowed, enhance the productivity in image reading while reducing power consumption, and can also prevent the S/N ratio regarding the image from being deteriorated.

Figure 14:
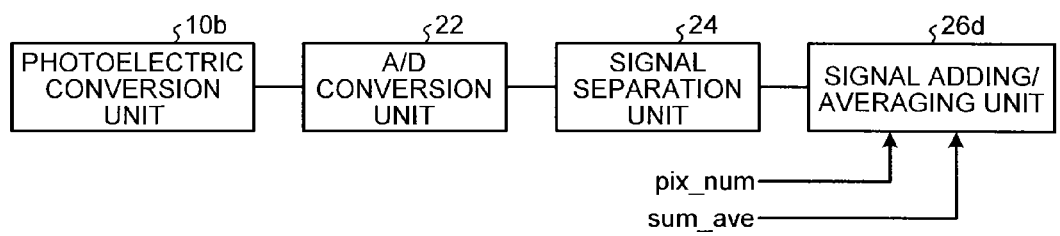
FIG. 14 is a block diagram illustrating a schematic configuration of a modified example of the solid-state image sensing device included in the image reading apparatus.

FIG. 14 is a block diagram illustrating a schematic configuration of a modified example of the solid-state image sensing device 2 included in the image reading apparatus 3. For example, as illustrated in FIG. 14, the modified example of the solid-state image sensing device 2 includes a photoelectric conversion unit 10*b*, an A/D conversion unit 22, a signal separation unit 24, and a signal adding/averaging unit 26*d*. In the modified example of the solid-state image sensing device 2 illustrated in FIG. 14, component members substantially identical to those forming the solid-state image sensing device illustrated in FIG. 5 are designated by identical reference numerals.

The signal adding/averaging unit 26*d* performs either addition or averaging of image signals outputted by the signal separation unit 24 for each group of a plurality of consecutive pixels. Here, the signal adding/averaging unit 26*d* performs the aforementioned addition or averaging of image signals in accordance with pix_num or sum_ave.

In the modified example of the solid-state image sensing device 2, when the signal adding/averaging unit 26*d* averages image signals, resolution conversion is performed with use of the number of operation pixels based on sum_ave.

Figure 15:
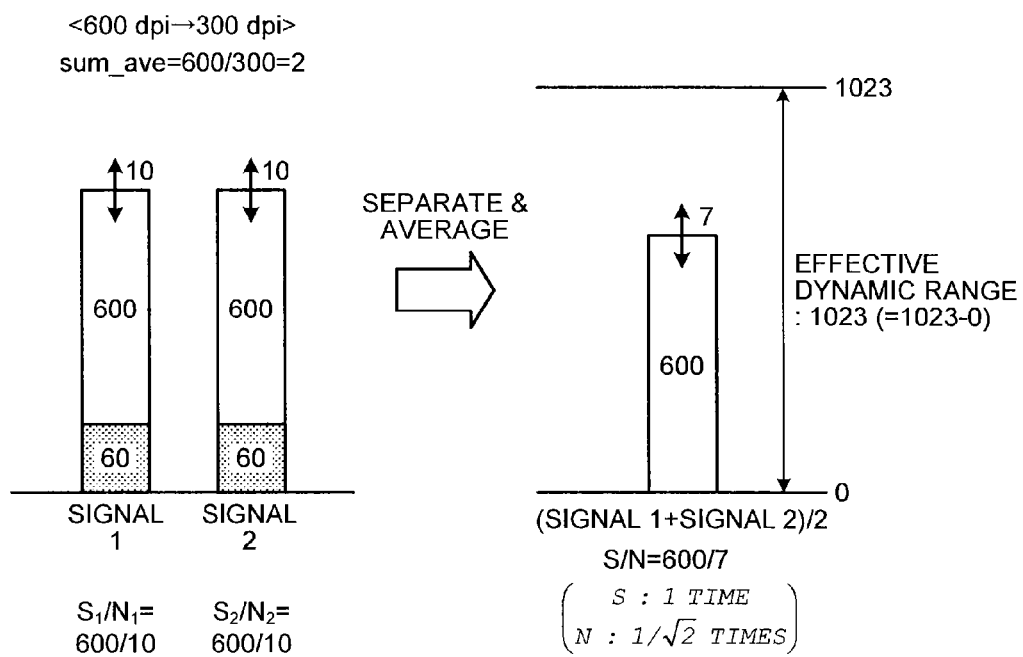
FIG. 15 illustrates a first operation example of the modified example of the solid-state image sensing device illustrated in FIG. 14.
Figure 16:
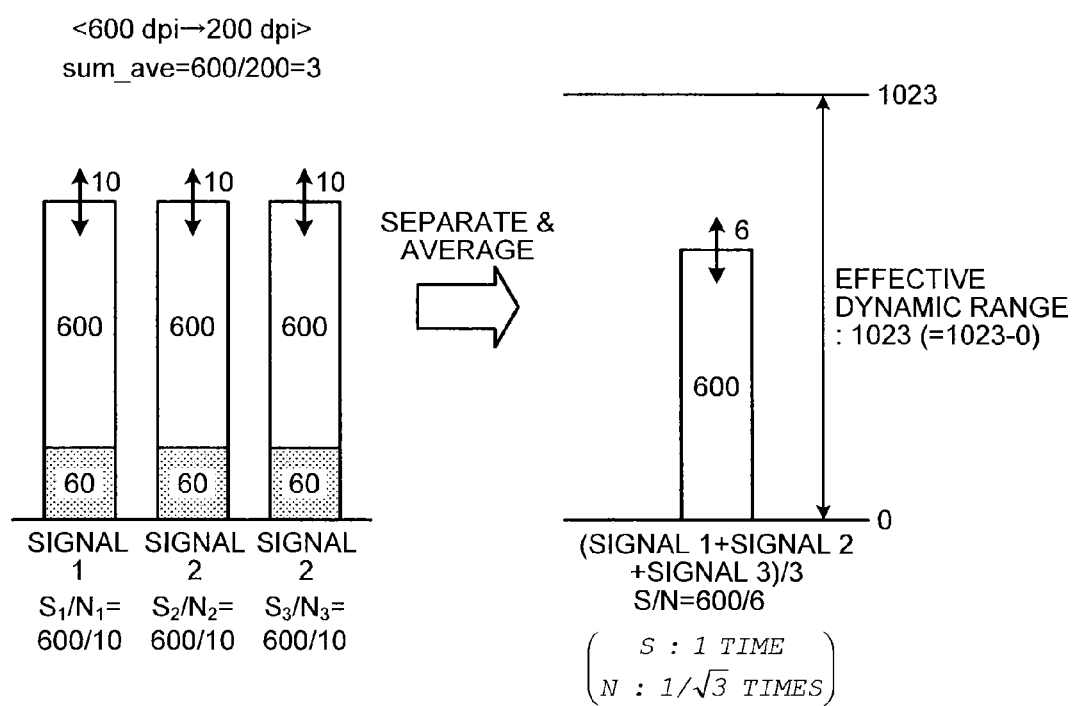
FIG. 16 illustrates a second operation example of the modified example of the solid-state image sensing device illustrated in FIG. 14.

FIG. 15 illustrates a first operation example of the modified example of the solid-state image sensing device 2 illustrated in FIG. 14. FIG. 16 illustrates a second operation example of the modified example of the solid-state image sensing device 2 illustrated in FIG. 14. The signal adding/averaging unit 26*d* averages image signals, so that a light shot noise (a shot noise with a value of 10 is assumed to be overlapped on the signals 1 and 2) overlapped on effective image data before averaging is reduced to 1/(positive square root of the number of operation pixels).

In the first operation example (FIG. 15), the modified example of the solid-state image sensing device 2 reduces the light shot noise to 7. More specifically, in the modified example of the solid-state image sensing device 2, the S/N ratio before averaging the image signals is 600/10=60, whereas the S/N ratio after averaging the image signals is 600/7=86.

In the second operation example (FIG. 16), the modified example of the solid-state image sensing device 2 reduces the light shot noise to 6. More specifically, in the modified example of the solid-state image sensing device 2, the S/N ratio before averaging the image signals is 600/10=60, whereas the S/N ratio after averaging the image signals is 600/6=100.

Thus, the modified example of the solid-state image sensing device 2 can enhance the S/N ratio (enhance the image quality) while securing the dynamic range in both the first operation example and the second operation example.

Figure 17:
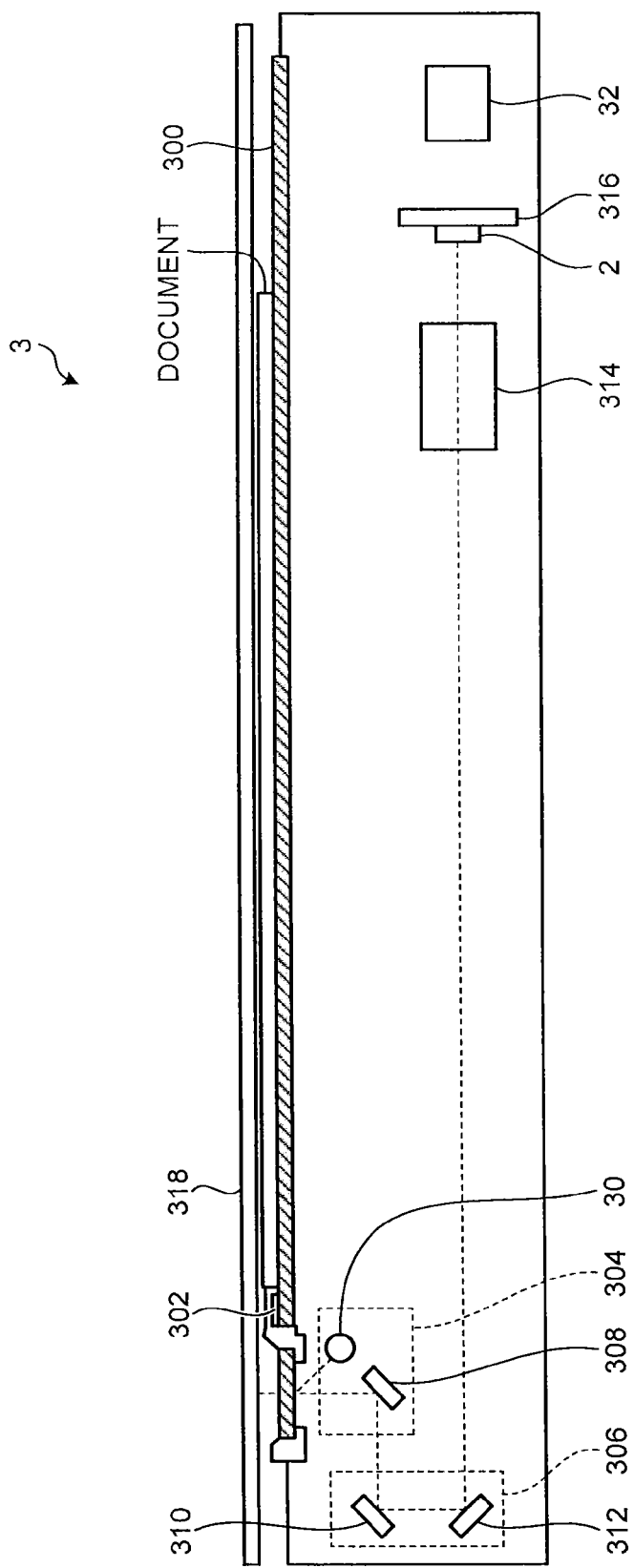
FIG. 17 is a side view of the image reading apparatus which incorporates the solid-state image sensing device according to the embodiments.

A description is now given of an example of an apparatus configuration in a case where the solid-state image sensing device 2 according to the embodiments is incorporated in the image reading apparatus 3. FIG. 17 is a side view of the image reading apparatus 3 which incorporates the solid-state image sensing device 2 according to the embodiments.

A document laid on a contact glass 300 is pressed with a pressurizing plate 318 so as to prevent displacement. The light source 30 for document irradiation irradiates the document with light. Reflected light from the document is reflected by three mirrors 308, 310 and 312, and inputted into the solid-state image sensing device 2 mounted on a board 316 via a lens 314.

The solid-state image sensing device 2 outputs an analog signal which is an image signal in accordance with the amount of inputted light. The analog signal is converted into a digital signal by the A/D conversion unit 22 (see FIG. 5) in the solid-state image sensing device 2. The converted signal is then subjected to specified image processing executed by an unshown image processing unit 34 (see FIG. 11), and is temporarily stored in an unshown storage device.

A reference value of the analog signal is the value obtained when reflected light from a reference white board 302 is inputted into the solid-state image sensing device 2. A first carriage 304 having the light source 30 and the mirror 308, and a second carriage 306 having the mirrors 310 and 312 perform scan in a direction approaching the solid-state image sensing device 2 in order to read the document. The image reading apparatus 3 may be configured such that the light source, the mirrors, the lens and the solid-state image sensing device 2 are integrated to scan and read the document.

Figure 18:
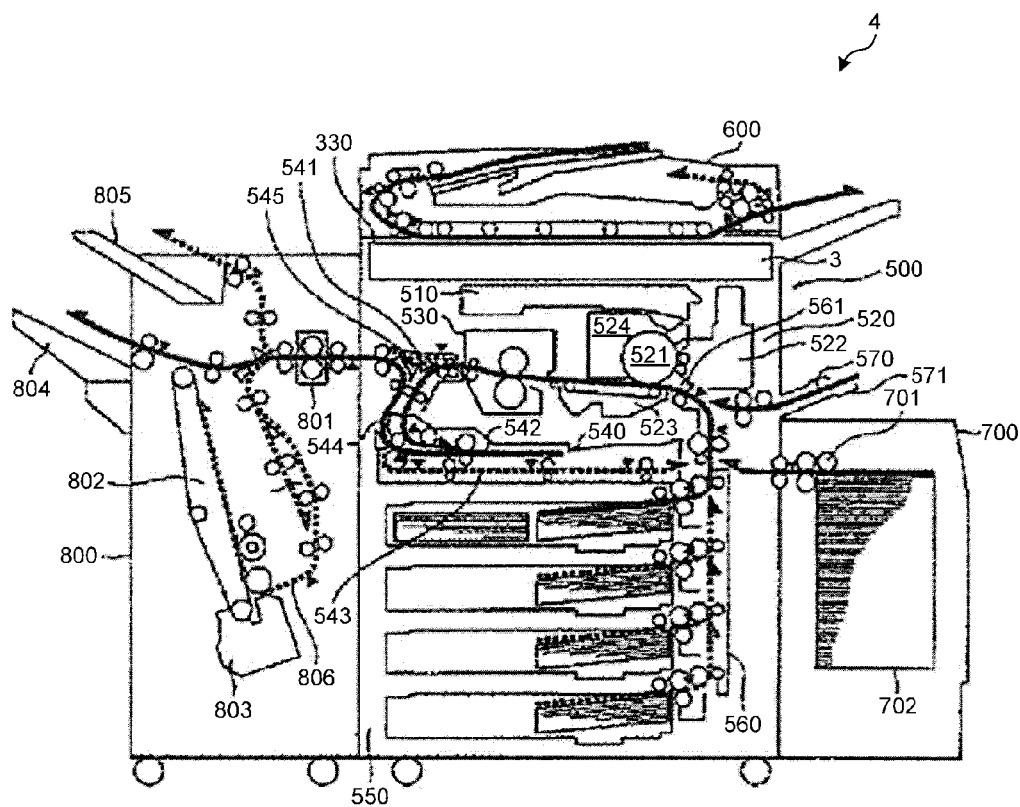
FIG. 18 is a side view of an image forming apparatus which incorporates the image reading apparatus having the solid-state image sensing device.

A description is now given of an image forming apparatus 4 which incorporates the image reading apparatus 3 having the solid-state image sensing device 2. FIG. 18 is a side view of the image forming apparatus 4 which incorporates the image reading apparatus 3 having the solid-state image sensing device 2.

The image reading apparatus 3 is utilized as an image scanner, which is used as an image input apparatus for personal computers (PCs) and the like, or is utilized as a document reading unit in the image forming apparatus 4, such as a copying machine, a fax machine, and a printer.

The image forming apparatus 4 includes an image forming apparatus body 500, an image reading apparatus 3 placed in an upper portion of the image forming apparatus body 500, an automatic document feeder (hereinafter referred to as "ADF") 600 mounted on top of the image reading apparatus 3, a large-capacity sheet feeder 700 arranged on the right-hand side of the image forming apparatus body 500 in FIG. 18, and a sheet post-processing apparatus 800 arranged on the left-hand side of the image forming apparatus body 500 in FIG. 18.

The image forming apparatus body 500 is an image forming section which is made up of an image writing unit 510, an image forming unit 520, a fixing unit 530, a double-sided conveying unit 540, a sheet feeding unit 550, a vertical conveying unit 560, and a manual feeding unit 570. The image writing unit 510 modulates an LD used as a light source based on image information on the document read with the image reading apparatus 3, and performs laser write onto a photoconductor drum 521 with a scanning optical system including a polygon mirror and an fe lens. The image forming unit 520 is made up of the photoconductor drum 521 and publicly known electrophotographic image forming elements, such as a developing unit 522, a transfer unit 523, a cleaning unit 524, and a neutralizing unit, provided along an outer circumference of the photosensitive drum 521.

The fixing unit 530 fixes an image transferred with the transfer unit 523 onto a transfer sheet. The double-sided conveying unit 540 includes a first switching claw 541 provided downstream of the fixing unit 530 in a transfer sheet conveying direction, for switching the transfer sheet conveying direction toward the sheet post-processing apparatus 800 or the double-sided conveying unit 540, a reverse conveying path 542 in which the transfer sheet is led by the first switching claw 541, an image forming-side conveying path 543 for conveying the transfer sheet reversed in the reverse conveying path 542 toward the transfer unit 523 again, and a post processing-side conveying path 544 for conveying the reversed transfer sheet toward the sheet post-processing apparatus 800. A second switching claw 545 is provided at a branch point between the image forming-side conveying path 543 and the post processing-side conveying path 544.

The sheet feeding unit 550 includes four feeding stages. A transfer sheet contained in the selected feeding stage is drawn out and is guided to the vertical conveying unit 560 by a pickup roller and a feed roller. In the vertical conveying unit 560, the transfer sheet fed from each feeding stage is conveyed to a registration roller 561 which is immediately before the transfer unit 523 in the sheet conveying direction. In the registration roller 561, the transfer sheet is fed into the transfer unit 523 in synchronization with the leading end of an image developed on the photoconductor drum 521. The manual feeding unit 570 has a manual feeding tray 571 which is freely opened and closed. The manual feeding tray 571 is opened to manually feed a transfer sheet as necessary. Also in this case, the registration roller 561 sets the conveyance timing of the transfer sheet, and the transfer sheet is conveyed accordingly.

The large-capacity sheet feeder 700 is adapted to stack and feed transfer sheets of the same size in large quantities. As the transfer sheets are consumed, a bottom plate 702 goes up so that a pickup roller 701 can pick up a transfer sheet. The transfer sheet fed from the pickup roller 701 is conveyed through the vertical conveying unit 560 to a nip of the registration roller 561.

The sheet post-processing apparatus 800 is adapted to execute specified processing, such as punching, aligning, stapling, and sorting. In this embodiment, the sheet post-processing apparatus 800 has a punch 801, a staple tray (aligning) 802, a stapler 803, and a shift tray 804 for the aforementioned functions. More specifically, in the case of punching the transfer sheets which are delivered from the image forming apparatus body 500 into the sheet post-processing apparatus 800, the sheets are punched one sheet at a time with the punch 801. If no more processing is performed, the punched sheets are discharged to a proof tray 805. If sorting, stacking and sorting are to be performed, the sheets are discharged to the shift tray 804. In this embodiment, sorting is implemented by reciprocating the shift tray 804 for a specified amount in a direction orthogonal to the sheet conveying direction. Or alternatively, sorting may be implemented by moving the sheets in a direction orthogonal to the sheet conveying direction in the paper conveying path.

In the case of aligning the sheets, the punched or unpunched transfer sheets are guided to a lower conveying path 806, and in the staple tray 804, the direction of the sheets orthogonal to the sheet conveying direction is aligned with use of a rear end fence, and the direction of the sheets parallel to the sheet conveying direction is aligned with use of a jogger fence. Here, if binding is to be performed, an aligned paper sheet bundle is bound at a specified position, such as a corner section and two center sections, by means of the stapler 803. The bound paper sheet bundle is discharged to the shift tray 804 with use of a discharge belt. In this embodiment, the lower conveying path 806 is provided with a pre-stack conveying path 807. The pre-stack conveying path 807 can stack two or more sheets while the sheets are being conveyed so as to avoid interruption of image forming operation in the image forming apparatus body 500 during post processing operation.

The image reading apparatus 3 optically scans a document which is guided by the ADF 600 onto a document table 330 and stops thereon. The image reading apparatus 3 uses the solid-state image sensing device 2 to read a read target image which has travelled through the first through third mirrors and imaged with an image formation lens. Specified image processing is performed on the read image data in an unshown image processing circuit, and the data is temporarily stored in a storage device. Then, at the time of image formation, the image writing unit 510 reads out the image data from the storage device, performs modulation according to the image data, and performs optical writing.

The embodiment provides the advantage of preventing the dynamic range of image data from being narrowed even when resolution conversion is performed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A solid-state image sensing device comprising:
circuitry configured to:
convert light into electrical signals for respective pixels, and output the electrical signals;
separate an offset signal, which is generated due to dark current, from each of the electrical signals to generate image signals, and output the image signals for the respective pixels; and
add, for each group of a plurality of pixels, the image signals of the plurality of pixels,
wherein the circuitry is configured to obtain an image signal after resolution conversion is performed for resolution reduction by addition of the image signals for each group of the plurality of pixels.

2. The solid-state image sensing device according to claim 1, wherein the circuitry is configured to:
perform A/D conversion of the electrical signals, and
separate the offset signal, which is generated due to the dark current, from each of the electrical signals obtained by the A/D conversion, and output the image signals which are digital signals of the respective pixels.

3. The solid-state image sensing device according to claim 1, wherein the circuitry is configured to perform A/D conversion of each of the image signal obtained by addition for each group of the plurality of pixels.

4. The solid-state image sensing device according to claim 1, wherein the circuitry is configured to add the image signals for each group of the plurality of pixels, a number of the image signals corresponding to a ratio between resolutions before and after resolution conversion performed for resolution reduction.

5. The solid-state image sensing device according to claim 1, wherein the circuitry is configured to add the image signals for each group of the plurality of pixels, a number of the image signals being a maximum integer equal to or less than a ratio between resolutions before and after resolution conversion performed for resolution reduction.

6. An image reading apparatus comprising a solid-state image sensing device, wherein
the solid-state image sensing device comprises:
circuitry configured to:
convert light into electrical signals for respective pixels, and output the electrical signals;
separate an offset signal, which is generated due to dark current, from each of the electrical signals to generate image signals, and output the image signals for the respective pixels; and
add, for each group of a plurality of pixels, the image signals of the plurality of pixels,
wherein the circuitry is configured to obtain an image signal after resolution conversion is performed for resolution reduction by addition of the image signals for each group of the plurality of pixels.

7. An image reading apparatus comprising the solid-state image sensing device according to claim 1, wherein
when an image reading period in a sub-scanning direction is shortened in accordance with resolutions in resolution conversion performed for resolution reduction, the circuitry is configured to add the image signals for each group of the plurality of pixels, a number of the image signals corresponding to a ratio between image reading periods in the sub-scanning direction before and after the resolution conversion.

8. An image reading apparatus comprising the solid-state image sensing device according to claim 1, wherein
when an amount of light from a light source is reduced in accordance with resolutions in resolution conversion performed for resolution reduction, the circuitry is configured to add the image signals for each group of the plurality of pixels, a number of the image signals corresponding to a ratio between amounts of light from the light source before and after the resolution conversion.

9. An image forming apparatus comprising:
the image reading apparatus according to claim 6; and
an image former that forms an image read by the image reading apparatus.

10. An image forming apparatus comprising:
the image reading apparatus according to claim 7; and
an image former that forms an image read by the image reading apparatus.

11. An image forming apparatus comprising:
the image reading apparatus according to claim 8; and
an image former that forms an image read by the image reading apparatus.

12. A solid-state image sensing device comprising:
circuitry configured to:
convert light into electrical signals for respective pixels, and output the electrical signals;
separate an offset signal, which is generated due to dark current, from each of the electrical signals to generate image signals, and output the image signals for the respective pixels; and
average, for each group of a plurality of pixels, the image signals of the plurality of pixels,
wherein the circuitry is configured to obtain an image signal after resolution conversion is performed for resolution reduction by addition of the image signals for each group of the plurality of pixels.

13. The solid-state image sensing device according to claim 1, wherein the circuitry is configured to receive the electrical signals, convert the electrical signals into parallel bits of digital signals, and output the converted electrical signals.

14. The solid-state image sensing device according to claim 1, wherein the circuitry is configured to add the image signals for each group of a plurality of consecutive pixels.

15. The solid-state image sensing device according to claim 13, wherein the circuitry is configured to separate the offset signal from each of the converted electrical signals to generate the image signals.

16. The solid-state image sensing device according to claim 1, wherein the circuitry is configured to separate the offset signal by digital correlated double sampling.

17. The solid-state image sensing device according to claim 1, wherein the circuitry is configured to separate the offset signal from each of the electrical signals after the electrical signals are converted into digital signals.

* * * * *